US010963888B2

(12) United States Patent
Zhou (10) Patent No.: US 10,963,888 B2
(45) Date of Patent: Mar. 30, 2021

(54) PAYMENT COMPLAINT METHOD, DEVICE, SERVER AND READABLE STORAGE MEDIUM

(71) Applicant: ADVANCED NEW TECHNOLOGIES CO., LTD., Grand Cayman (KY)

(72) Inventor: Yuanzheng Zhou, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/882,670

(22) Filed: May 25, 2020

(65) Prior Publication Data

US 2020/0286100 A1 Sep. 10, 2020

Related U.S. Application Data

(63) Continuation of application No. PCT/CN2020/071234, filed on Jan. 9, 2020.

(30) Foreign Application Priority Data

Apr. 10, 2019 (CN) .......................... 201910285016.4

(51) Int. Cl.
*G06Q 10/10* (2012.01)
*G06Q 30/06* (2012.01)
(Continued)

(52) U.S. Cl.
CPC ......... *G06Q 30/016* (2013.01); *G06Q 20/047* (2020.05)

(58) Field of Classification Search
CPC .......................... G06Q 30/016; G06Q 20/047
(Continued)

(56) References Cited

U.S. PATENT DOCUMENTS

| 7,104,443 | B1 | 9/2006 | Paul et al. |
| 8,626,592 | B2 * | 1/2014 | Simakov ............ G06Q 20/4037 |
| | | | 705/16 |

(Continued)

FOREIGN PATENT DOCUMENTS

| CN | 101599151 A | 12/2009 |
| CN | 103955643 A | 7/2014 |

(Continued)

OTHER PUBLICATIONS

First Office Action for Chinese Application No. 2019102850164, dated Apr. 15, 2020, 8 pages.

(Continued)

*Primary Examiner* — Jonathan P Ouellette (57) ABSTRACT

A method for processing payment complaint includes receiving, from a user terminal, a complaint query request of a user; querying, in response to the complaint query request, a transaction database according to user information of the user to acquire at least one target payment card corresponding to the payment complaint of the user; generating, according to the user information and the at least one target payment card, complaint voucher information of the user and returning to the user terminal the complaint voucher information; receiving a complaint creation request from the user terminal, wherein the complaint creation request is created by the user terminal based on the complaint voucher information; and creating, in response to the complaint creation request, a corresponding complaint task of the user.

17 Claims, 4 Drawing Sheets

(51) Int. Cl.
  *G06Q 10/06* (2012.01)
  *G06Q 10/08* (2012.01)
  *G06Q 30/02* (2012.01)
  *G06Q 30/00* (2012.01)
  *G06Q 20/04* (2012.01)

(58) Field of Classification Search
  USPC .................................................. 705/1.1–912
  See application file for complete search history.

(56) References Cited

U.S. PATENT DOCUMENTS

| | | | |
|---|---|---|---|
| 8,781,963 B1* | 7/2014 | Feng | G06Q 20/108 |
| | | | 705/42 |
| 9,058,626 B1 | 6/2015 | Donaho et al. | |
| 9,098,842 B2* | 8/2015 | Ahluwalia | G06Q 20/4012 |
| 2006/0249570 A1 | 11/2006 | Seifert et al. | |
| 2009/0299898 A1 | 12/2009 | Korosec et al. | |
| 2010/0274691 A1* | 10/2010 | Hammad | G06Q 20/3224 |
| | | | 705/30 |
| 2011/0125619 A1 | 5/2011 | Talbert et al. | |
| 2011/0282789 A1* | 11/2011 | Carroll | H04W 12/04031 |
| | | | 705/44 |
| 2012/0185378 A1 | 7/2012 | Liu | |
| 2013/0024358 A1* | 1/2013 | Choudhuri | G06Q 20/4016 |
| | | | 705/38 |
| 2013/0226717 A1* | 8/2013 | Ahluwalia | G06Q 20/3821 |
| | | | 705/16 |
| 2014/0108241 A1 | 4/2014 | Tunnell et al. | |
| 2014/0274314 A1 | 9/2014 | Cage et al. | |
| 2015/0082212 A1* | 3/2015 | Sharda | H04L 67/26 |
| | | | 715/764 |
| 2015/0161611 A1 | 6/2015 | Duke et al. | |
| 2015/0199689 A1 | 7/2015 | Kumnick et al. | |
| 2015/0227935 A1* | 8/2015 | Adjaoute | G06Q 50/265 |
| | | | 705/44 |
| 2015/0339656 A1* | 11/2015 | Wilson | G06Q 20/385 |
| | | | 705/44 |
| 2016/0048831 A1 | 2/2016 | Ongchin | |
| 2016/0210628 A1 | 7/2016 | McGuire | |
| 2016/0224973 A1 | 8/2016 | van Os et al. | |
| 2017/0186003 A1 | 6/2017 | Monaghan | |
| 2018/0107944 A1* | 4/2018 | Lin | G06N 5/045 |
| 2018/0315029 A1 | 11/2018 | Kim | |
| 2019/0114645 A1* | 4/2019 | Gaitanos | G06Q 20/3223 |

FOREIGN PATENT DOCUMENTS

| | | |
|---|---|---|
| CN | 105163822 A | 12/2015 |
| CN | 107705003 A | 2/2018 |
| CN | 108022080 A | 5/2018 |
| CN | 108446905 A | 8/2018 |
| CN | 108650240 A | 10/2018 |
| CN | 109118374 A | 1/2019 |
| CN | 110163739 A | 8/2019 |

OTHER PUBLICATIONS

Second Office Action for Chinese Application No. 2019102850164, dated Jun. 12, 2020, 10 pages.
Search Report for Chinese Application No. 2019102850164, dated Apr. 9, 2020.
Search Report for Chinese Application No. 2019102850164, dated Jun. 5, 2020.
Written Opinion and International Search Report for PCT Application No. PCT/CN2020/071234 made available to public dated Oct. 15, 2020.

* cited by examiner

PAYMENT COMPLAINT METHOD, DEVICE, SERVER AND READABLE STORAGE MEDIUM

CROSS REFERENCE TO RELATED APPLICATIONS

This application is a continuation application of International Application No. PCT/CN2020/071234, filed on Jan. 9, 2020, which claims priority to and benefits of Chinese Patent Application No. 201910285016.4 filed on Apr. 10, 2019. The contents of the above-referenced applications are incorporated herein by reference in their entirety.

TECHNICAL FIELD

The embodiments of the specification relate to the technical field of data processing, and in particular relate to a method and device, a server and a readable storage medium for processing a payment complaint.

BACKGROUND

Currently, in a scenario where payments by cards under an international risk control mechanism, payment cards may be rejected because of risk control when a user uses them to make payments. But some of the payment cards are incorrectly rejected. In this case, if the user hopes that a second payment attempt can succeed, the user needs to make a complaint by sending card information. However, the card information provided by the user is not necessarily related to the card to be reviewed for risk control. Thus, the card to be reviewed (namely, a target payment card) can be provided only after manual communications with the users, in which the user is urged to submit the target payment card for a complaint.

In the prior art, high-risk cards of the user are first obtained by fetching data from a database and using an analytical tool to perform an analysis. The communications are made with the user to acquire at least one card as the target payment card from high-risk cards. Finally, the user is urged to submit the target payment card for a complaint. In this case, the determination of the target payment card requires multiple manual communications with the user, resulting in a long time to handle a complaint and a low efficiency.

SUMMARY

The embodiments of the specification provide a payment complaint method and device, a server and a readable storage medium to effectively shorten the time to handle a user complaint and improve the handling efficiency.

In a first aspect, the specification provides a payment complaint method. The method includes: receiving a target user's complaint query request from user equipment; responding to the complaint query request and querying a transaction database according to target user information of the target user to acquire the corresponding complained target payment card of the target user; generating complaint voucher information of the target user according to the target user information and the target payment card and returning the complaint voucher information to the user equipment; receiving a complaint creation request from the user equipment, responding to the complaint creation request and creating a corresponding complaint task of the target user, wherein the complaint creation request is created by the user equipment based on the complaint voucher information.

In a second aspect, the specification provides a payment complaint device. The device includes: a complaint query request receiving unit, configured to receive a target user's complaint query request from user equipment; a complaint query request responding unit, configured to respond to the complaint query request and query a transaction database according to target user information of the target user to acquire the corresponding complained target payment card of the target user; a complaint voucher generating and sending unit, configured to generate complaint voucher information of the target user according to the target user information and the target payment card and return the complaint voucher information to the user equipment; a complaint creation request receiving unit, configured to receive a complaint creation request from the user equipment; a complaint creation request responding unit, configured to respond to the complaint creation request and create a corresponding complaint task of the target user, wherein the complaint creation request is created by the user equipment based on the complaint voucher information.

In a third aspect, the specification further provides a payment complaint system. The system include: user equipment, configured to acquire a complaint operation of a target user, respond to the complaint operation, generate a complaint query request of the target user and send the complaint query request to a server, and the server, configured to receive the complaint query request, respond to the complaint query request, query a transaction data according to target user information of the target user to acquire the corresponding complained target payment card of the target user, generate complaint voucher information of the target user according to the target user information and the target payment card and return the complaint voucher information to the user equipment. The user equipment is configured to receive the complaint voucher information, create the complaint creation request according to the complaint voucher information and send the complaint creation request to the server. The server is used receive the complaint creation request, respond to the complaint creation request and create a corresponding complaint task of the target user.

In a fourth aspect, the specification further provides a server, which comprises a memory, a processor and a computer program which is stored in the memory and can run on the processor, and the processor executes the program to implement the steps of the above-mentioned payment complaint method.

In a fifth aspect, the specification further provides a computer-readable storage medium, which stores a computer program, and the computer program implements the steps of the above-mentioned payment complaint method when executed by a processor.

In a sixth aspect, the specification further provides a method for processing a payment complaint. The method includes: receiving, by a server from a user terminal, a complaint query request of a user; querying, by the server in response to the complaint query request, a transaction database according to user information of the user to acquire at least one target payment card corresponding to the payment complaint of the user, generating, by the server according to the user information and the at least one target payment card, complaint voucher information of the user and returning to the user terminal the complaint voucher information; receiving, by the server, a complaint creation request from the user terminal, wherein the complaint creation request is created by the user terminal based on the complaint voucher information; and creating, by the server in response to the complaint creation request, a corresponding complaint task of the user. The at least one target payment card corresponding to the payment complaint of the user is acquired by: querying the transaction database to determine whether a first number of high-risk cards used by the user is equal to or greater than a preset threshold, wherein the high-risk cards are blacklisted payment cards used by the user in transactions; and in response to determining that the first number is equal to or greater than the preset threshold, selecting at least one of the high-risk cards as the at least one target payment card; in response to determining that the first number is less than the preset threshold, querying the transaction database to determine whether a sum of a second number of abnormal cards used by the user and the first number is equal to or greater than the preset threshold, wherein the abnormal cards include at least one of payment cards used in the transactions where an address of a payment terminal does not match a shipping address or payment cards used in the transactions where an amount of payment does not match an amount of transaction; and in response to determining that the sum of the first number and the second number is equal to or greater than the preset threshold, selecting the high-risk cards and at least one of the abnormal cards as the at least one target payment card.

In some embodiments, the querying, by the server in response to the complaint query request, a transaction database according to user information of the user to acquire at least one target payment card corresponding to the payment complaint of the user includes: determining, by the server, whether offline data in the transaction database includes transaction data of the user; in response to determining that the offline data includes the transaction data of the user, analyzing, by the server, the transaction data of the user in the offline data to acquire the at least one target payment card; and in response to determining that the offline data does not include the transaction data of the user, analyzing, by the server, transaction data of the user in online data to acquire the at least one target payment card.

In some embodiments, the querying, by the server in response to the complaint query request, a transaction database according to user information of the user to acquire at least one target payment card corresponding to the payment complaint of the user includes: querying, by the server according to the user information, the transaction database to acquire the at least one target payment card through a payment card identification policy or a payment card identification model.

In some embodiments, the at least one target payment card corresponding to the payment complaint of the user is further acquired by: in response to determining that the sum of the first number and the second number is less than the preset threshold, querying, by the server, the transaction database to acquire a third number of non-abnormal cards used by the user; and determining, by the server, whether a sum of the third number, the second number, and the first number is equal or greater than the preset threshold, wherein the non-abnormal cards include at least one of payment cards used in the transactions where an address of a payment terminal matches a shipping address or payment cards used in the transactions where an amount of payment matches an amount of transaction.

In some embodiments, the at least one target payment card corresponding to the payment complaint of the user is further acquired by: in response to determining that the sum of the third number, the second number, and the first number is equal to or greater than the preset threshold, selecting, by the server, the high-risk cards, the abnormal cards, and at least one of the non-abnormal cards as the at least one target payment card.

In some embodiments, the at least one target payment card corresponding to the payment complaint of the user is further acquired by: in response to determining that the sum of the third number, the second number, and the first number is less than the preset threshold, acquiring, by the server, new cards used by the user, wherein the new cards include payment cards most recently used by the user.

In some embodiments, the at least one target payment card corresponding to the payment complaint of the user is further acquired by: selecting, by the server, the high-risk cards, the abnormal cards, the non-abnormal cards, and at least one of the new cards as the at least one target payment card.

In a seventh aspect, the specification further provides an apparatus. The apparatus includes one or more processors and a memory storing instructions executable by the one or more processors to cause the one or more processors to perform operations comprising: receiving, from a user terminal, a complaint query request of a user; querying, in response to the complaint query request, a transaction database according to user information of the user to acquire at least one target payment card corresponding to the payment complaint of the user; generating, according to the user information and the at least one target payment card, complaint voucher information of the user and returning to the user terminal the complaint voucher information; receiving a complaint creation request from the user terminal, wherein the complaint creation request is created by the user terminal based on the complaint voucher information; and creating, in response to the complaint creation request, a corresponding complaint task of the user. The at least one target payment card corresponding to the payment complaint of the user is acquired by: querying the transaction database to determine whether a first number of high-risk cards used by the user is equal to or greater than a preset threshold, wherein the high-risk cards are blacklisted payment cards used by the user in transactions; and in response to determining that the first number is equal to or greater than the preset threshold, selecting at least one of the high-risk cards as the at least one target payment card; in response to determining that the first number is less than the preset threshold, querying the transaction database to determine whether a sum of a second number of abnormal cards used by the user and the first number is equal to or greater than the preset threshold, wherein the abnormal cards include at least one of payment cards used in the transactions where an address of a payment terminal does not match a shipping address or payment cards used in the transactions where an amount of payment does not match an amount of transaction; and in response to determining that the sum of the first number and the second number is equal to or greater than the preset threshold, selecting the high-risk cards and at least one of the abnormal cards as the at least one target payment card.

In an eighth aspect, the specification further provides one or more non-transitory computer-readable storage media configured with instructions executable by one or more processors to cause the one or more processors to perform operations comprising: receiving, from a user terminal, a complaint query request of a user; querying, in response to the complaint query request, a transaction database according to user information of the user to acquire at least one target payment card corresponding to the payment complaint of the user; generating, according to the user information and the at least one target payment card, complaint voucher information of the user and returning to the user terminal the complaint voucher information; receiving a complaint creation request from the user terminal, wherein the complaint creation request is created by the user terminal based on the complaint voucher information; and creating, in response to the complaint creation request, a corresponding complaint task of the user. The at least one target payment card corresponding to the payment complaint of the user is acquired by: querying the transaction database to determine whether a first number of high-risk cards used by the user is equal to or greater than a preset threshold, wherein the high-risk cards are blacklisted payment cards used by the user in transactions; and in response to determining that the first number is equal to or greater than the preset threshold, selecting at least one of the high-risk cards as the at least one target payment card; in response to determining that the first number is less than the preset threshold, querying the transaction database to determine whether a sum of a second number of abnormal cards used by the user and the first number is equal to or greater than the preset threshold, wherein the abnormal cards include at least one of payment cards used in the transactions where an address of a payment terminal does not match a shipping address or payment cards used in the transactions where an amount of payment does not match an amount of transaction; and in response to determining that the sum of the first number and the second number is equal to or greater than the preset threshold, selecting the high-risk cards and at least one of the abnormal cards as the at least one target payment card.

The advantageous effects of the specification include at least the following: based on the above-mentioned technical solution, the complaint query request is responded to, and the transaction database is automatically queried according to the target user information of the target user to acquire the corresponding complained target payment card of the target user. The technical solution can greatly shorten the time for acquiring the target payment card and effectively improve the complaint efficiency, compared with the acquisition of the target payment card through manual communications. In addition, the accuracy of automatic screening-out of the target payment card satisfying the complaint conditions according to the transaction data of the target user through the above-mentioned target payment card identification policy is high.

DETAIL DESCRIPTION OF EMBODIMENTS

To better understand the above-mentioned technical solution, the following will describe in detail the technical solution in combination with the drawings and specific embodiments. It should be understood that the embodiments in the present application and specific characteristics in the embodiments are configured to describe in detail the technical solution but are not configured to restrict the technical solution in the present application. Without any conflict, the embodiments in the present application and the technical characteristics in the embodiments can be combined.

Figure 1:
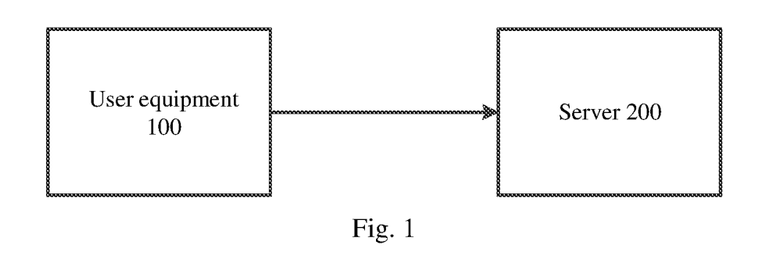
FIG. 1 is a block diagram of the payment complaint system according to one example embodiment of the specification.

In one aspect, as shown in FIG. 1, a payment complaint system provided in embodiments of the specification comprises user equipment 100 and a server 200.

The user equipment 100 is configured to acquire a complaint operation of a target user, respond to the complaint operation, generate a complaint query request of the target user and send the complaint query request to a server 200.

The server 200 is configured to receive the complaint query request, respond to the complaint query request, query a transaction data according to target user information of the target user to acquire the corresponding complained target payment card of the target user, generate complaint voucher information of the target user according to the target user information and the target payment card and return the complaint voucher information to the user equipment 100. The user equipment 100 is configured to receive the complaint voucher information, create the complaint creation request according to the complaint voucher information and send the complaint creation request to the server 200, and the server 200 is configured to receive the complaint creation request, respond to the complaint creation request and create a corresponding complaint task of the target user.

In some embodiments, the payment cards include credit payment tools used by the user in transactions, such as bank cards and electronic payment cards.

The user equipment 100 can display a complaint page on the display unit of the user equipment 100 or the display unit connected to the user equipment 100, receive the complaint operation of the target user on the complaint page, respond to the complaint operation, generate the complaint query request and send the complaint query request to the server 200, wherein the complaint operation can be an operation of clicking the complaint query button on the complaint page or a voice message collected by sound acquisition equipment, the sound acquisition equipment can be arranged in the user equipment 100, the sound acquisition equipment can also be equipment connected to the user equipment 100, the sound acquisition equipment can be a microphone or a recorder, for example, and the complaint page can be an H5 page.

In some embodiments, the user equipment 100 can be a smart phone, a tablet PC, a desktop PC, a notebook PC, for example, and further, the server 200 can be a desktop PC, a cloud server or a notebook PC, for example.

Figure 2:
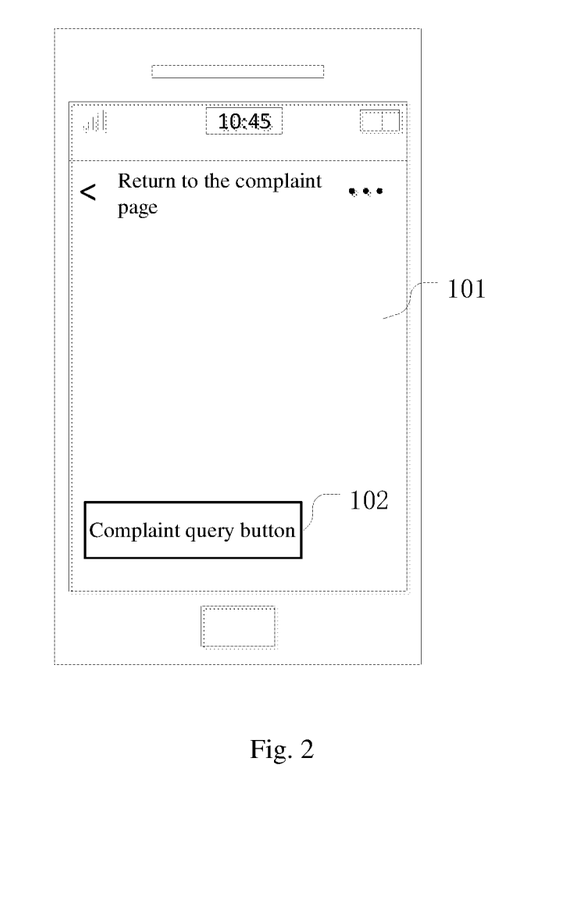
FIG. 2 shows a complaint request page displayed on user equipment (terminal) according to one example embodiment of the specification.

As shown in FIG. 2, the target user is user A, for example, a complaint page 101 is displayed on the display unit of the user equipment 100, user A clicks the complaint query button 102 on the complaint page 101 to generate a complaint query request, wherein the complaint query request contains user information of user A, and the user equipment sends the complaint query request to the server 200.

In some embodiments, the server 200 can determine whether the target user has the complaint right before responding to the complaint query request. If the target user has the complaint right, the server responds to the complaint query request, and if the target use has no complaint right, the server does not respond to the complaint query request and returns a no-complaint-right message to the user equipment 100.

In some embodiments, the server 200 can determine whether offline data in the transaction database contains transaction data of the target user before responding to the complaint query request. The server analyzes the transaction data of the target user in the offline data to acquire the target payment card if the offline data contains transaction data of the target user, and analyzes the transaction data of the target user in the online data to acquire the target payment card if the offline data contains no transaction data of the target user.

Transaction data of a plurality of users is stored in the transaction database, the transaction data includes user information, payment information and information of the user equipment used for payments, and the payment information includes the information of payment cards and the amounts of payment. In this way, when determining whether the offline data in the transaction database contains transaction data of the target user, the server can query the transaction data of the target user in the offline data according to the target user information. If finding transaction data, the server determines that the offline data contains transaction data of the target user, and then analyzes the transaction data of the target user in the offline data to acquire the target payment card. If finding no transaction data, the server determines that the offline data contains no transaction data of the target user, and then analyzes the transaction data of the target user in the online data to acquire the target payment card.

In some embodiments, the complaint query request contains the target user information of the target user. In this way, after the user equipment 100 sends the complaint query request to the server 200, the server 200 can acquire the target user information of the target user.

When determining the offline data contains transaction data of the target user, the server can analyze the transaction data of the target user in the offline data and selects at least one payment card as the target payment card according to the transaction data of the target user.

In some embodiments, when the server queries a transaction database according to target user information of the target user to acquire the corresponding complained target payment card of the target user, the server can query the transaction database according to the target user information to acquire the target payment card through a target payment card identification policy, and/or query the transaction database according to the target user information to acquire the target payment card through a target payment card identification model.

When determining that the offline data contains transaction data of the target user, the server can analyze the transaction data of the target user to acquire the target payment card through the target payment card identification policy, and/or analyze the transaction data of the target user to acquire the target payment card through the target payment card identification model.

Accordingly, when determining that the online data contains transaction data of the target user, the server can analyze the transaction data of the target user to acquire the target payment card through the target payment card identification policy, and/or analyze the transaction data of the target user to acquire the target payment card through the target payment card identification model.

In some embodiments, the target payment card identification model can be created according to transaction data of history users, and the logic of the target payment card identification model can be the same as or different from the logic of the target payment card identification policy, not restricted in the present application.

In some embodiments, a method for the server 200 to query the transaction database according to the target user information to acquire the target payment card through a target payment card identification policy may include the following operations.

In S301, the method includes querying the transaction database to determine whether a first number of high-risk cards used by the target user is no less than a preset threshold, wherein the high-risk cards are blacklisted payment cards used by the target user in transactions.

In S302, the method includes selecting at least one payment card as the target payment card from the high-risk cards if the first number is no less than the preset threshold.

In S303, the method includes querying the transaction database to determine whether the sum of a second number of abnormal cards used by the target user and the first number is no less than the preset threshold if the first number is less than the preset threshold, wherein the abnormal cards include at least one type of the payment cards used by the target user in transactions where the address of the payment equipment does not match the receiving address and the payment cards used in transactions where the amount of payment does not match the amount of transaction.

In S304, the method includes selecting at least one payment card as the target payment card from the abnormal cards and high-risk cards used by the target user if the sum of the first number and the second number is no less than the preset threshold.

In S305, the method includes querying the transaction database to acquire a third number of non-abnormal cards used by the target user and determine whether the sum of the third number, the second number and the first number is no less than the preset threshold if the sum of the first number and the second number is less than the preset threshold, wherein the non-abnormal cards include at least one type of the payment cards used by the target user in transactions where the address of the payment equipment matches the receiving address and the payment cards used in transactions where the amount of payment matches the amount of transaction.

In S306, the method includes selecting at least one payment card as the target payment card from the high-risk cards, abnormal cards and non-abnormal cards used by the target user if the sum of the third number, the second number and the first number is no less than the preset threshold.

In S307, the method includes acquiring new cards used by the target user and select at least one payment card as the target payment card from the high-risk cards, abnormal cards, non-abnormal cards and new cards used by the target user if the sum of the third number, the second number and the first number is less than the preset threshold, wherein the new cards include the payment cards used by the target user last time.

When performing step S301, the server first queries the transaction database according to the target user information to acquire transaction data of the target user, then analyzes the transaction data of the target user to acquire the first number of high-risk cards used by the target user, then determines whether the first number is no less than the preset threshold, performs step S302 if the first number is no less than the preset threshold, and step S303 if the first number is less than the preset threshold.

When acquiring the first number, the server can analyze the transaction data of the target user and use the number of high-risk cards used by the target user within a preset period of time as the first number.

In some embodiments, the preset threshold can be manually preset or preset by the server 200 according to the actual requirements, and the preset threshold can be an integer no less than 1, for example, 2, 3 or 4, and is not restricted in the present application. Further, the preset period of time can be manually preset or preset by the server 200 according to the actual requirements, and the preset period of time can be 2 days, 3 weeks or 4 months, for example, and is not restricted in the present application.

The server performs step S302 to select at least one payment card as the target payment card from the high-risk cards if the first number is no less than the preset threshold.

One or more payment cards can be selected as the target payment cards from the high-risk payment cards used by the target user, and the number of payment cards selected can be equal to, or less than or greater than the preset threshold and is not restricted in the present application.

For example, the first number is 4, and the preset threshold is 3. Since 4 is >3, 3 high-risk cards can be selected as the target payment cards from the 4 high-risk cards.

The server performs step S303 to analyze the transaction data of the target user to acquire the second number and determine whether the sum of the second number and the first number is no less than the preset threshold if the first number is less than the preset threshold, performs step S304 if the sum is no less than the preset threshold, and performs step S305 if the sum is less than the preset threshold.

When acquiring the second number, the server can analyze the transaction data of the target user and use the number of abnormal cards used by the target user within a preset period of time as the second number.

When the abnormal cards include the payment cards used by the target user in transactions where the address of the payment equipment does not match the receiving address, the server can analyze the transaction data of the target user, determine whether the address of the payment equipment used in a transaction matches the receiving address, determine the payment card used in the transaction to be a non-abnormal card if the address of the payment equipment used in the transaction matches the receiving address, and determine the payment card used in the transaction to be an abnormal card if the address of the payment equipment used in the transaction does not match the receiving address.

When determining whether the address of the payment equipment used in a transaction matches the receiving address, the server can acquire the address of the payment equipment used in the transaction through the positioning equipment arranged in the payment equipment, and determine whether the address of the payment equipment used in the transaction and the corresponding receiving address of the transaction are located in the same region. If the address of the payment equipment used in the transaction and the corresponding receiving address of the transaction are located in the same region, the server determines that the address of the payment equipment used in the transaction matches the corresponding receiving address of the transaction. Otherwise, the server determines that the address of the payment equipment used in the transaction does not match the corresponding receiving address of the transaction.

When the server determines whether the address of the payment equipment used in a transaction and the corresponding receiving address of the transaction are located in the same region, the same region can be set according to the system, or set manually, or set according to the actual requirement. The same region can correspond to a city, a district in a city or a sub-district in a city, and is not restricted in the present application.

For example, if the same region corresponds to a city, the server determines whether the address of the payment equipment used in a transaction and the corresponding receiving address of the transaction are located in the same city. If they are located in the same city, the server determines that the address of the payment equipment used in the transaction matches the corresponding receiving address of the transaction. Otherwise, the server determines that the address of the payment equipment used in the transaction does not match the corresponding receiving address of the transaction.

When the abnormal cards include the payment cards used by the target user in transactions where the amount of payment does not match the amount of transaction, the server acquires the amount of payment and the amount of transaction of the target user in transactions, then determines whether the amount of payment and the amount of transaction of the target user in a transaction are equal, if the amount of payment and the amount of transaction in a transaction are equal, determines that the amount of payment and the amount of transaction in the transaction match each other and then determines the payment card used in the transaction to be a non-abnormal card, and otherwise determines that the amount of payment and the amount of transaction in the transaction do not match each other and then determines the payment card used in the transaction to be an abnormal card.

When the abnormal cards include the payment cards used by the target user in transactions where the address of the payment equipment does not match the receiving address and the payment cards used in transactions where the amount of payment does not match the amount of transaction, if the address of the payment equipment used in a transaction matches the receiving address and the amount of payment matches the amount of transaction, the server determines the payment card used in the transaction to be a non-abnormal card, and otherwise, determines the payment card used in the transaction to be an abnormal card.

If the sum of the first number and the second number is no less than the preset threshold, the server performs step S304 to select at least one payment card from the abnormal cards used by the target user, and the high-risk cards used by the target user as the target payment cards, or select at least one payment card as the target payment card from the abnormal cards used by the target user, or select at least one payment card from the abnormal cards used by the target user and at least one payment card from the high-risk cards used by the target user as target payment cards.

For example, if the first number is 2 and the preset threshold is 3, since 2<3, the server queries the transaction database to acquire the second number of abnormal cards used by the target user and the second number is 2. Since 2+2=4>3, the server selects one abnormal card from the two abnormal cards and 2 high-risk cards as the target payment cards.

If the sum of the first number and the second number is less than the preset threshold, the server performs step S305 to analyze the transaction data of the target user to acquire the third number, then determine whether the sum of the third number, the second number and the first number is no less than the preset threshold, performs step S306 if the sum is no less than the preset threshold, and performs step S307 if the sum is less than the preset threshold.

If the sum of the third number, the second number and the first number is no less than the preset threshold, the server performs step S306 to select at least one payment card from the non-abnormal cards used by the target user, and the high-risk cards and abnormal cards used by the target user as the target payment cards, or select at least one card from one or more types of non-abnormal cards, high-risk cards and abnormal cards used by the target user as the target payment card.

For example, if the first number is 1 and the preset threshold is 3, since 1<3, the server queries the transaction database to acquire a second number of abnormal cards used by the target user and the second number is 1. Since 1+1=2<3, the server continues to query the transaction database to acquire a third number of non-abnormal cards used by the target user. If the third number is 3, since 1+1+3=5>3, the sever selects one non-abnormal card from the three non-abnormal cards, and then uses the selected non-abnormal card, the one high-risk card and the one abnormal card as the target payment cards.

If the sum of the third number, the second number and the first number is less than the preset threshold, the server performs step S307 to acquire the new cards used by the target user and select at least one payment card from the high-risk cards, abnormal cards, non-abnormal cards and new cards used by the target user as the target payment card.

For example, if the first number is 0 and the preset threshold is 3, since 0<3, the server queries the transaction database to acquire a second number of abnormal cards used by the target user and the second number is 1. Since 1<3, the server continues to query the transaction database to acquire a third number of non-abnormal cards used by the target user. If the third number is 1, since 1+1=2<3, the server continues to query the transaction database to acquire the new cards used by the target user. If the number of the target payment cards is 3, the server selects one payment card from the new cards used by the target user, and uses the selected one new card, the one abnormal card and the one non-abnormal card as the target payment cards.

In some embodiments, in order to let the selected target payment cards better satisfy the complaint conditions, time constraints can be set when the high-risk cards, non-abnormal cards and abnormal cards used by the target user in transactions are acquired by querying the transaction database, and in addition, each time constraint set for acquiring the high-risk cards, non-abnormal cards and abnormal cards used by the target user in transactions can be the same or can be different.

For example, the high-risk cards used by the target user in transactions in recent six months can be acquired by querying the transaction database, the abnormal cards used by the target user in transactions in recent 60 days can be acquired by querying the transaction database, and non-abnormal cards used by the target user in transactions in recent 50 days can be acquired by querying the transaction database.

In this way, the automatic screening-out of the target payment cards satisfying the complaint conditions according to the transaction data of the target user through the above-mentioned target payment card identification policy can greatly shorten the time for acquiring the target payment cards and effectively improve the complaint efficiency, compared with the acquisition of the target payment cards through manual communications. In addition, through the above-mentioned target payment card identification policy, the target payment cards satisfying the complaint conditions can be automatically screened out more accurately.

In some embodiments, after acquiring the target payment cards, the server 200 can further generate complaint voucher information of the target user according to the target user information and the target payment cards, wherein the complaint voucher information can be displayed in graphics or words. When the complaint voucher information is returned to the user equipment 100, the complaint voucher information can be first compressed and then returned to the user equipment 100 so as to reduce the transmission time and traffic of the complaint voucher information.

In some embodiments, the user equipment 100 is configured to receive the complaint voucher information, create the complaint creation request according to the complaint voucher information and send the complaint creation request to the server 200, wherein the complaint creation request contains the complaint voucher information; after receiving the complaint creation request, the server 200 responds to the complaint creation request, creates a corresponding complaint task of the target user, then handles the complaint task to obtain the handling result of the complaint task, allows the target payment cards used by the target user to complete payments if the handling result indicates that the complaint succeeds, and forbids the target payment cards used by the target user to complete payments if the handling result indicates that the complaint fails.

Figure 3:
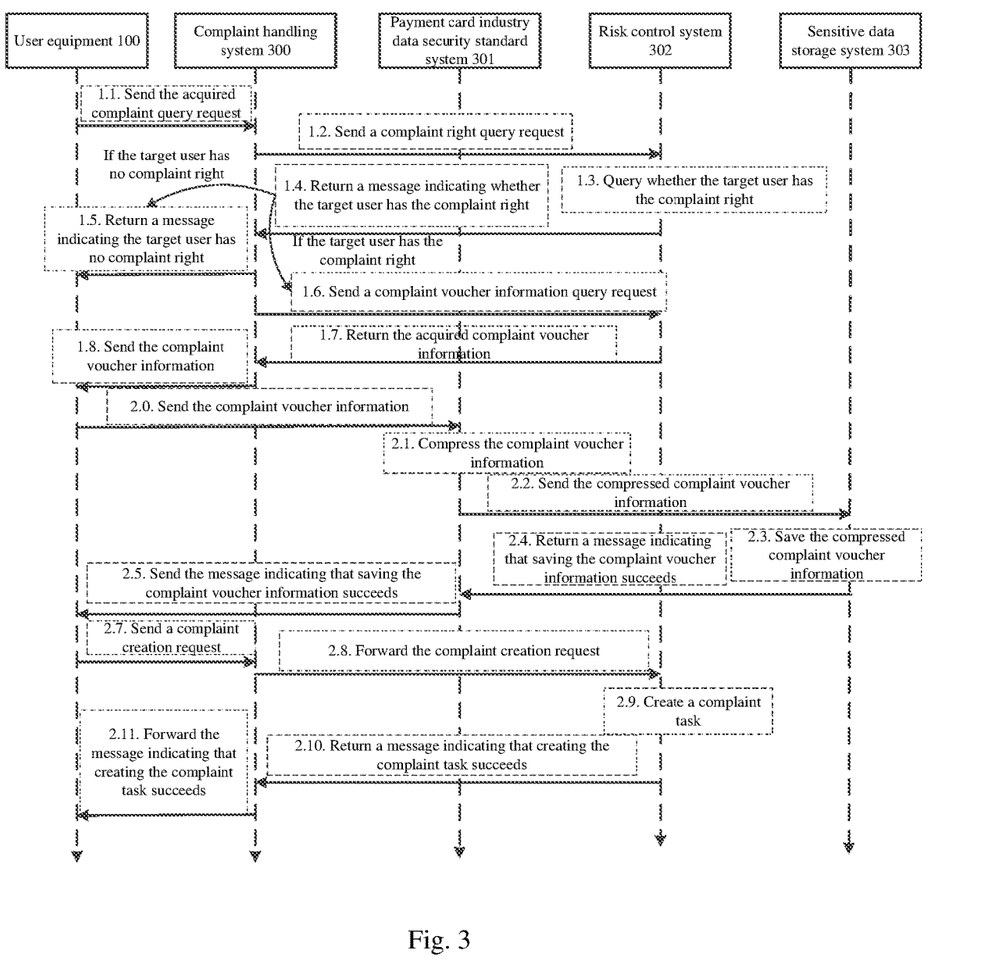
FIG. 3 is a ladder diagram illustrating operations between user equipment, a complaint handling system, a payment card industry data security standard system, a risk control system, and a sensitive data storage system according to one example embodiment of the specification.

In practical applications, as shown in FIG. 3, when the above-mentioned steps are performed on the server 200, the above-mentioned steps can be performed by the complaint handling system 300, the payment card industry data security standard system 301, the risk control system 302 and the sensitive data storage system 303. The specific implantation process is as follows:

The user equipment 100 first performs step 1.1 to send the acquired complaint query request to the complaint handling system 300; after receiving the complaint query request, the complaint handling system 300 performs step 1.2 to send a complaint right query request to the risk control system 302, wherein the complaint right query request is generated based on the complaint query request; after receiving the complaint right query request, the risk control system 302 performs step 1.3 to query whether the target user has the complaint right (specifically respond to the complaint right query request and query whether the target user has the complaint right), and then performs step 1.4 to return a message indicating whether the target user has the complaint right; after receiving the message indicating whether the target user has the complaint right from the risk control system 302, the complaint handling system 300 performs step 1.5 to return a message indicating the target user has no complaint right to the user equipment 100 if the target user has no complaint right, and performs step 1.6 to send a complaint voucher information query request to the risk control system 302 if the target user has the complaint right; after receiving the complaint voucher information query request, the risk control system 302 performs step 1.7 to return the acquired complaint voucher information; after receiving the complaint voucher information, the complaint handling system 300 performs step 1.8 to send the complaint voucher information to the user equipment 100.

Next, after receiving the complaint voucher information, the user equipment 100 performs step 2.0 to send the complaint voucher information to the payment card industry data security standard system 301; after receiving the complaint voucher information, the payment card industry data security standard system 301 performs step 2.1 to compress the complaint voucher information and then performs step 2.2 to send the compressed complaint voucher information to the sensitive data storage system 303 for saving; after receiving the compressed complaint voucher information, the sensitive data storage system 303 performs step 2.3 to save the compressed complaint voucher information, and then performs step 2.4 to return a message indicating that saving the complaint voucher information succeeds; after receiving the message indicating that saving the complaint voucher information succeeds, the payment card industry data security standard system 301 performs step 2.5 to send the message indicating that saving the complaint voucher information succeeds to the user equipment 100.

Further, after receiving the message indicating that saving complaint voucher information succeeds, the user equipment 100 performs step 2.6 to create a complaint creation request according to the complaint voucher information, and then performs step 2.7 to send the complaint creation request to the complaint handling system 300; after receiving the complaint creation request, the complaint handling system 300 performs step 2.8 to forward the complaint creation request to the risk control system 302; after receiving the complaint creation request, the risk control system 302 performs step 2.9 to create a complaint task, and then performs step 2.10 to return a message indicating that creating the complaint task succeeds; after receiving the message indicating that creating the complaint task succeeds, the complaint handling system 300 performs step 2.11 to forward the message indicating that creating the complaint task succeeds to the user equipment 100.

The technical solution adopted in the embodiments of the specification is as follows: The complaint query request is responded to and the target payment cards satisfying the complaint conditions can be automatically screened out according to the transaction data of the target user through the above-mentioned target payment card identification policy. This technical solution can greatly shorten the time for acquiring the target payment cards and effectively improve the complaint efficiency, compared with the acquisition of the target payment cards through manual communications. In addition, through the above-mentioned target payment card identification policy, the target payment cards satisfying the complaint conditions can be automatically screened out more accurately.

Figure 4:
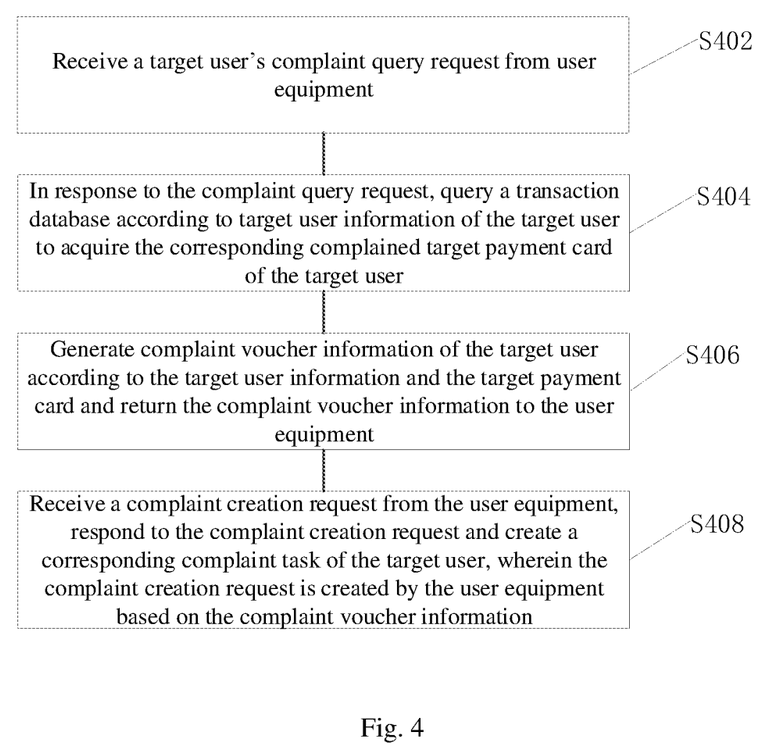
FIG. 4 is a flowchart of the payment complaint method according to one example embodiment of the specification.

In one aspect, the specification provides a payment complaint method. As shown in FIG. 4, the payment complaint method includes the following operations.

In S402, the method includes receiving a target user's complaint query request from user equipment.

In S404, the method includes, in response to the complaint query request, querying a transaction database according to target user information of the target user to acquire the corresponding complained target payment card of the target user.

In S406, the method includes generating complaint voucher information of the target user according to the target user information and the target payment card, and returning the complaint voucher information to the user equipment.

In S408, the method includes receiving a complaint creation request from the user equipment, and in response to the complaint creation request, creating a corresponding complaint task of the target user. The complaint creation request is created by the user equipment based on the complaint voucher information.

Alternatively, querying a transaction database according to target user information of the target user to acquire the corresponding complained target payment card of the target user comprises: determining whether offline data in the transaction database contains transaction data of the target user; analyzing the transaction data of the target user in the offline data to acquire the target payment card if the offline data contains transaction data of the target user; analyzing the transaction data of the target user in the online data to acquire the target payment card if the offline data contains no transaction data of the target user.

Alternatively, querying a transaction database according to target user information of the target user to acquire the corresponding complained target payment card of the target user comprises: querying the transaction database according to the target user information to acquire the target payment card through a target payment card identification policy, and/or querying the transaction database according to the target user information to acquire the target payment card through a target payment card identification model.

Alternatively, querying the transaction database according to the target user information to acquire the target payment card through a target payment card identification policy comprises: querying the transaction database to determine whether a first number of high-risk cards used by the target user is no less than a preset threshold, wherein the high-risk cards are blacklisted payment cards used by the target user in transactions; and selecting at least one payment card as the target payment card from the high-risk cards if the first number is no less than the preset threshold.

Alternatively, querying the transaction database according to the target user information to acquire the target payment card through a target payment card identification policy comprises: querying the transaction database to determine whether the sum of a second number of abnormal cards used by the target user and the first number is no less than the preset threshold if the first number is less than the preset threshold, wherein the abnormal cards include at least one type of the payment cards used by the target user in transactions where the address of the payment equipment does not match the receiving address and the payment cards used in transactions where the amount of payment does not match the amount of transaction; and selecting at least one payment card as the target payment card from the abnormal cards and high-risk cards used by the target user if the sum of the first number and the second number is no less than the preset threshold.

Alternatively, querying the transaction database according to the target user information to acquire the target payment card through a target payment card identification policy comprises: querying the transaction database to acquire a third number of non-abnormal cards used by the target user and determining whether the sum of the third number, the second number and the first number is no less than the preset threshold if the sum of the first number and the second number is less than the preset threshold, wherein the non-abnormal cards include at least one type of the payment cards used by the target user in transactions where the address of the payment equipment matches the receiving address and the payment cards used in transactions where the amount of payment matches the amount of transaction; and selecting at least one payment card as the target payment card from the high-risk cards, abnormal cards and non-abnormal cards used by the target user if the sum of the third number, the second number and the first number is no less than the preset threshold.

Alternatively, querying the transaction database according to the target user information to acquire the target payment card through a target payment card identification policy comprises: acquiring new cards used by the target user and selecting at least one payment card as the target payment card from the high-risk cards, abnormal cards, non-abnormal cards and new cards used by the target user if the sum of the third number, the second number and the first number is less than the preset threshold, wherein the new cards include the payment cards used by the target user last time.

Figure 5:
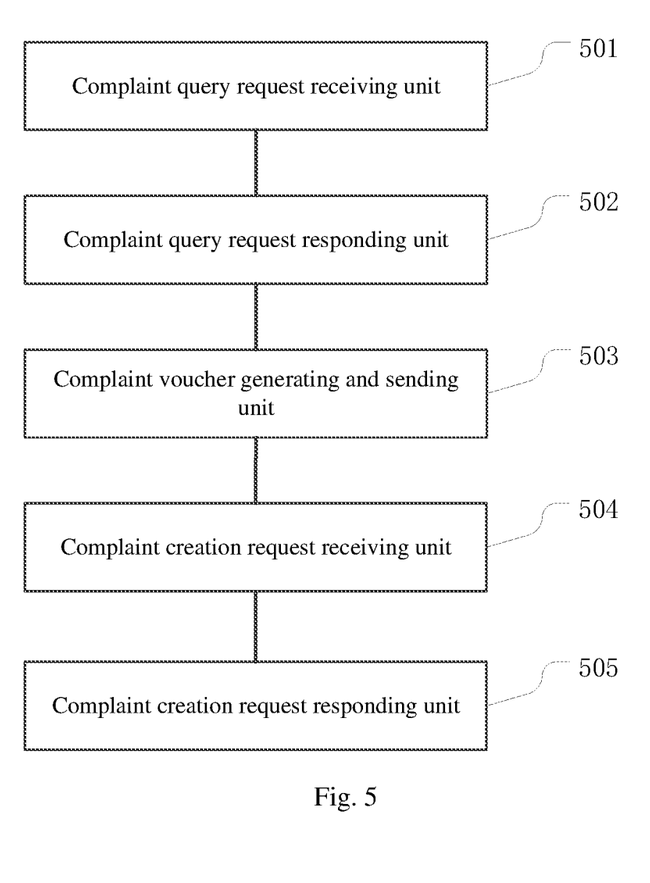
FIG. 5 is a block diagram of the payment complaint apparatus according to one example embodiment of the specification.

In another aspect, the specification provides a payment complaint device based on the same technical conception as the one in the second aspect. As shown in FIG. 5, the payment complaint device comprises: a complaint query request receiving unit 501, a complaint query request responding unit 502, a complaint voucher generating and sending unit 503, a complaint creation request receiving unit 504, and a complaint creation request responding unit 505.

The complaint query request receiving unit 501 is configured to receive a target user's complaint query request from user equipment.

The complaint query request responding unit 502 is configured to respond to the complaint query request and query a transaction database according to target user information of the target user to acquire the corresponding complained target payment card of the target user.

The complaint voucher generating and sending unit 503 is configured to generate complaint voucher information of the target user according to the target user information and the target payment card and return the complaint voucher information to the user equipment.

The complaint creation request receiving unit 504 is configured to receive a complaint creation request from the user equipment.

The complaint creation request responding unit 505 is configured to respond to the complaint creation request and create a corresponding complaint task of the target user, wherein the complaint creation request is created by the user equipment based on the complaint voucher information.

Alternatively, the complaint query request responding unit 502 is specifically configured to determine whether offline data in the transaction database contains transaction data of the target user, analyze the transaction data of the target user in the offline data to acquire the target payment card if the offline data contains transaction data of the target user, and analyze the transaction data of the target user in the online data to acquire the target payment card if the offline data contains no transaction data of the target user.

Alternatively, the complaint query request responding unit 502 is further configured to query the transaction database according to the target user information to acquire the target payment card through a target payment card identification policy, and/or query the transaction database according to the target user information to acquire the target payment card through a target payment card identification model.

Alternatively, the complaint query request responding unit 502 is further configured to query the transaction database to determine whether a first number of high-risk cards used by the target user is no less than a preset threshold, wherein the high-risk cards are blacklisted payment cards used by the target user in transactions, and select at least one payment card as the target payment card from the high-risk cards if the first number is no less than the preset threshold.

Alternatively, the complaint query request responding unit 502 is further configured to query the transaction database to determine whether the sum of a second number of abnormal cards used by the target user and the first number is no less than the preset threshold if the first number is less than the preset threshold, wherein the abnormal cards include at least one type of the payment cards used by the target user in transactions where the address of the payment equipment does not match the receiving address and the payment cards used in transactions where the amount of payment does not match the amount of transaction, and select at least one payment card as the target payment card from the abnormal cards and high-risk cards used by the target user if the sum of the first number and the second number is no less than the preset threshold.

Alternatively, the complaint query request responding unit 502 is further configured to query the transaction database to acquire a third number of non-abnormal cards used by the target user, determine whether the sum of the third number, the second number and the first number is no less than the preset threshold if the sum of the first number and the second number is less than the preset threshold, wherein the non-abnormal cards include at least one type of the payment cards used by the target user in transactions where the address of the payment equipment matches the receiving address and the payment cards used in transactions where the amount of payment matches the amount of transaction, and select at least one payment card as the target payment card from the high-risk cards, abnormal cards and non-abnormal cards used by the target user if the sum of the third number, the second number and the first number is no less than the preset threshold.

Alternatively, the complaint query request responding unit 502 is further configured to acquire new cards used by the target user and select at least one payment card as the target payment card from the high-risk cards, abnormal cards, non-abnormal cards and new cards used by the target user if the sum of the third number, the second number and the first number is less than the preset threshold, wherein the new cards include the payment cards used by the target user last time.

Figure 6:
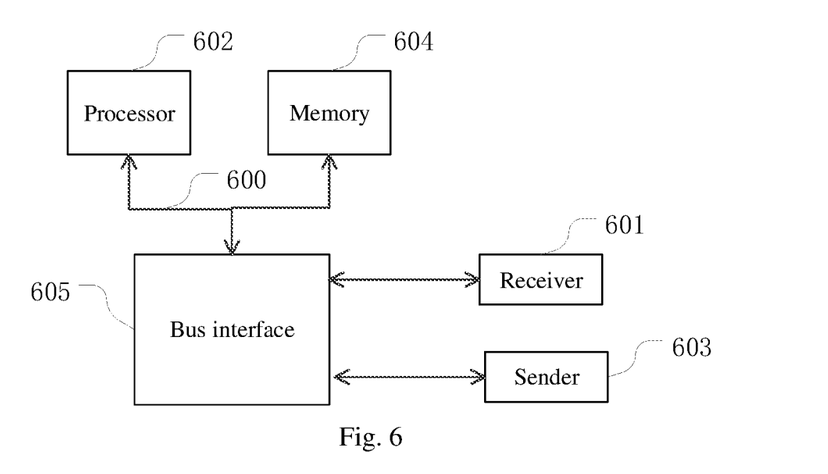
FIG. 6 is a block diagram of a server according to one example embodiment of the specification.

In yet another aspect, the specification further provides a server based on the same conception as the one of the payment complaint method in the above-mentioned embodiments. As shown in FIG. 6, the server comprises a memory 604, a processor 602 and a computer program which is stored in the memory 604 and can run on the processor 602, wherein the processor 602 executes the program to implement the steps of any of the above-mentioned payment complaint methods.

In the bus architecture (represented by a bus 600) shown in FIG. 6, the bus 600 can include any number of interconnected buses and bridges, and the bus 600 connects together one or more processors represented by the processor 602 and one or more memories represented by the memory 604. The bus 600 can also connect together other circuits such as peripherals, voltage regulators and power management circuits. All this is common knowledge in the art, and therefore the bus is not further described in this document. A bus interface 605 is provided between the bus 600 and the receiver 601/sender 603. The receiver 601 and the sender 603 can be the same element, namely, a transceiver, and provide units configured to communicate with other devices on a transmission medium. The processor 602 is responsible for managing the bus 600 and common processing, and the memory 604 can be configured to store data used when the processor 602 performs operations.

In another aspect, the specification further provides a computer-readable storage medium based on the same conception as the one of the payment complaint method in the above-mentioned embodiments. A computer program is stored in the computer-readable storage medium and the computer program implements the steps of any of the above-mentioned payment complaint methods when executed by the processor.

The specification is described by reference to the flowchart and/or block diagram of the method, device (system) and computer program product In some embodiments. It should be understood that each process in the flowchart and/or block in the block diagram and the combination of the processes in the flowchart and/or the blocks in the block diagram can be realized by computer program commands. These computer program commands can be provided in a general-purpose computer, a dedicated computer, an embedded processor or the processor of other programmable data processing equipment to produce a machine so that the commands executed by a computer or the processor of other programmable data processing equipment can produce a device configured to realize the designated functions in one process or more processes in the flowchart and/or in one block or more blocks in the block diagram.

These computer program commands can also be stored in a computer readable storage which can boot a computer or other programmable data processing equipment to work in a specific mode so that the commands stored in the computer readable storage can produce manufactures including a command device. The command device realizes the designated functions in one process or more processes in the flowchart and/or in one block or more blocks in the block diagram.

These computer program commands can also be uploaded to a computer or other programmable data processing equipment so that a series of operation steps are performed on the computer or other programmable data processing equipment to produce the processing realized by the computer and the commands executed on the computer or other programmable data processing equipment provide the steps for realizing the designated functions in one process or more processes in the flowchart and/or in one block or more blocks in the block diagram.

Although preferred embodiments are described, those skilled in the art can make changes and modifications to these embodiments once they learn the basic creative concepts. Therefore, the appended claims are intended to be interpreted as covering the preferred embodiments and all changes and modifications falling within the scope of the specification.

Obviously, those skilled in the art can make various modifications and variations to the specification, without departing from the spirit and scope of the specification. If these modifications and variations fall within the scope of the claims of the specification and equivalent technologies, the specification is also intended to include these modifications and variations.

What is claimed is:

1. A method for processing a payment complaint, comprising:
    creating, by a server, a target payment card identification model with historical transaction data of users;
    receiving, by the server from a user terminal, a complaint query request of a user;
    querying, by the server in response to the complaint query request, a transaction database according to user information of the user;
    acquiring, by the server, at least one target payment card corresponding to the payment complaint of the user, by invoking the target payment card identification model to perform operations including:
        querying the transaction database to determine whether a first number of high-risk cards used by the user is equal to or greater than a preset threshold, wherein the high-risk cards are blacklisted payment cards used by the user in transactions;
        in response to determining that the first number is equal to or greater than the preset threshold, selecting at least one of the high-risk cards as the at least one target payment card;
        in response to determining that the first number is less than the preset threshold, querying the transaction database to determine whether a sum of a second number of abnormal cards used by the user and the first number is equal to or greater than the preset threshold, wherein the abnormal cards include at least one of payment cards used in the transactions where an address of a payment terminal does not match a shipping address or payment cards used in the transactions where an amount of payment does not match an amount of transaction; and
        in response to determining that the sum of the first number and the second number is equal to or greater than the preset threshold, selecting the high-risk cards and at least one of the abnormal cards as the at least one target payment card;
    generating, by the server according to the user information and the at least one target payment card, complaint voucher information of the user and returning to the user terminal the complaint voucher information;
    receiving, by the server, a complaint creation request from the user terminal, wherein the complaint creation request is created by the user terminal based on the complaint voucher information; and
    creating, by the server in response to the complaint creation request, a corresponding complaint task of the user.

2. The method according to claim 1, wherein the querying, by the server in response to the complaint query request, a transaction database according to user information of the user to acquire at least one target payment card corresponding to the payment complaint of the user comprises:
    determining, by the server, whether offline data in the transaction database includes transaction data of the user;
    in response to determining that the offline data includes the transaction data of the user, analyzing, by the server, the transaction data of the user in the offline data to acquire the at least one target payment card; and
    in response to determining that the offline data does not include the transaction data of the user, analyzing, by the server, transaction data of the user in online data to acquire the at least one target payment card.

3. The method according to claim 1, wherein the at least one target payment card corresponding to the payment complaint of the user is further acquired by invoking the target payment card identification model to perform:
    in response to determining that the sum of the first number and the second number is less than the preset threshold, querying, by the server, the transaction database to acquire a third number of non-abnormal cards used by the user; and
    determining, by the server, whether a sum of the third number, the second number, and the first number is equal or greater than the preset threshold, wherein the non-abnormal cards include at least one of payment cards used in the transactions where an address of a payment terminal matches a shipping address or payment cards used in the transactions where an amount of payment matches an amount of transaction.

4. The method according to claim 3, wherein the at least one target payment card corresponding to the payment complaint of the user is further acquired by invoking the target payment card identification model to perform:
in response to determining that the sum of the third number, the second number, and the first number is equal to or greater than the preset threshold, selecting, by the server, the high-risk cards, the abnormal cards, and at least one of the non-abnormal cards as the at least one target payment card.

5. The method according to claim 4, wherein the at least one target payment card corresponding to the payment complaint of the user is further acquired by invoking the target payment card identification model to perform:
in response to determining that the sum of the third number, the second number, and the first number is less than the preset threshold, acquiring, by the server, new cards used by the user, wherein the new cards include payment cards most recently used by the user.

6. The method according to claim 5, wherein the at least one target payment card corresponding to the payment complaint of the user is further acquired by invoking the target payment card identification model to perform:
selecting, by the server, the high-risk cards, the abnormal cards, the non-abnormal cards, and at least one of the new cards as the at least one target payment card.

7. An apparatus, comprising:
one or more processors; and
a memory storing instructions executable by the one or more processors to cause the one or more processors to perform operations comprising:
creating a target payment card identification model with historical transaction data of users;
receiving, from a user terminal, a complaint query request of a user;
querying, in response to the complaint query request, a transaction database according to user information of the user;
acquiring at least one target payment card corresponding to the payment complaint of the user, by invoking the target payment card identification model to perform operations including:
querying the transaction database to determine whether a first number of high-risk cards used by the user is equal to or greater than a preset threshold, wherein the high-risk cards are blacklisted payment cards used by the user in transactions;
in response to determining that the first number is equal to or greater than the preset threshold, selecting at least one of the high-risk cards as the at least one target payment card;
in response to determining that the first number is less than the preset threshold, querying the transaction database to determine whether a sum of a second number of abnormal cards used by the user and the first number is equal to or greater than the preset threshold, wherein the abnormal cards include at least one of payment cards used in the transactions where an address of a payment terminal does not match a shipping address or payment cards used in the transactions where an amount of payment does not match an amount of transaction; and
in response to determining that the sum of the first number and the second number is equal to or greater than the preset threshold, selecting the high-risk cards and at least one of the abnormal cards as the at least one target payment card;
generating, according to the user information and the at least one target payment card, complaint voucher information of the user and returning to the user terminal the complaint voucher information;
receiving a complaint creation request from the user terminal, wherein the complaint creation request is created by the user terminal based on the complaint voucher information; and
creating, in response to the complaint creation request, a corresponding complaint task of the user.

8. The apparatus according to claim 7, wherein the querying, in response to the complaint query request, a transaction database according to user information of the user to acquire at least one target payment card corresponding to the payment complaint of the user comprises:
determining whether offline data in the transaction database includes transaction data of the user;
in response to determining that the offline data includes the transaction data of the user, analyzing the transaction data of the user in the offline data to acquire the at least one target payment card; and
in response to determining that the offline data does not include the transaction data of the user, analyzing transaction data of the user in online data to acquire the at least one target payment card.

9. The apparatus according to claim 7, wherein the at least one target payment card corresponding to the payment complaint of the user is further acquired by invoking the target payment card identification model to perform:
in response to determining that the sum of the first number and the second number is less than the preset threshold, querying the transaction database to acquire a third number of non-abnormal cards used by the user; and
determining whether a sum of the third number, the second number, and the first number is equal or greater than the preset threshold, wherein the non-abnormal cards include at least one of payment cards used in the transactions where an address of a payment terminal matches a shipping address or payment cards used in the transactions where an amount of payment matches an amount of transaction.

10. The apparatus according to claim 9, wherein the at least one target payment card corresponding to the payment complaint of the user is further acquired by invoking the target payment card identification model to perform:
in response to determining that the sum of the third number, the second number, and the first number is equal to or greater than the preset threshold, selecting the high-risk cards, the abnormal cards, and at least one of the non-abnormal cards as the at least one target payment card.

11. The apparatus according to claim 10, wherein the at least one target payment card corresponding to the payment complaint of the user is further acquired by invoking the target payment card identification model to perform:
in response to determining that the sum of the third number, the second number, and the first number is less than the preset threshold, acquiring new cards used by the user, wherein the new cards include payment cards most recently used by the user.

12. The apparatus according to claim 11, wherein the at least one target payment card corresponding to the payment complaint of the user is further acquired by invoking the target payment card identification model to perform:
  selecting the high-risk cards, the abnormal cards, the non-abnormal cards, and at least one of the new cards as the at least one target payment card.

13. One or more non-transitory computer-readable storage media configured with instructions executable by one or more processors to cause the one or more processors to perform operations comprising:
  creating a target payment card identification model with historical transaction data of users;
  receiving, from a user terminal, a complaint query request of a user;
  querying, in response to the complaint query request, a transaction database according to user information of the user;
  acquiring at least one target payment card corresponding to the payment complaint of the user, by invoking the target payment card identification model to perform operations including:
    querying the transaction database to determine whether a first number of high-risk cards used by the user is equal to or greater than a preset threshold, wherein the high-risk cards are blacklisted payment cards used by the user in transactions;
    in response to determining that the first number is equal to or greater than the preset threshold, selecting at least one of the high-risk cards as the at least one target payment card;
    in response to determining that the first number is less than the preset threshold, querying the transaction database to determine whether a sum of a second number of abnormal cards used by the user and the first number is equal to or greater than the preset threshold, wherein the abnormal cards include at least one of payment cards used in the transactions where an address of a payment terminal does not match a shipping address or payment cards used in the transactions where an amount of payment does not match an amount of transaction; and
    in response to determining that the sum of the first number and the second number is equal to or greater than the preset threshold, selecting the high-risk cards and at least one of the abnormal cards as the at least one target payment card;
  generating, according to the user information and the at least one target payment card, complaint voucher information of the user and returning to the user terminal the complaint voucher information;
  receiving a complaint creation request from the user terminal, wherein the complaint creation request is created by the user terminal based on the complaint voucher information; and
  creating, in response to the complaint creation request, a corresponding complaint task of the user.

14. The one or more non-transitory computer-readable storage media according to claim 13, wherein the querying, in response to the complaint query request, a transaction database according to user information of the user to acquire at least one target payment card corresponding to the payment complaint of the user comprises:
  determining whether offline data in the transaction database includes transaction data of the user;
  in response to determining that the offline data includes the transaction data of the user, analyzing the transaction data of the user in the offline data to acquire the at least one target payment card; and
  in response to determining that the offline data does not include the transaction data of the user, analyzing transaction data of the user in online data to acquire the at least one target payment card.

15. The one or more non-transitory computer-readable storage media according to claim 13, wherein the at least one target payment card corresponding to the payment complaint of the user is further acquired by invoking the target payment card identification model to perform:
  in response to determining that the sum of the first number and the second number is less than the preset threshold, querying the transaction database to acquire a third number of non-abnormal cards used by the user; and
  determining whether a sum of the third number, the second number, and the first number is equal or greater than the preset threshold, wherein the non-abnormal cards include at least one of payment cards used in the transactions where an address of a payment terminal matches a shipping address or payment cards used in the transactions where an amount of payment matches an amount of transaction.

16. The one or more non-transitory computer-readable storage media according to claim 15, wherein the at least one target payment card corresponding to the payment complaint of the user is further acquired by invoking the target payment card identification model to perform:
  in response to determining that the sum of the third number, the second number, and the first number is equal to or greater than the preset threshold, selecting the high-risk cards, the abnormal cards, and at least one of the non-abnormal cards as the at least one target payment card.

17. The one or more non-transitory computer-readable storage media according to claim 16, wherein the at least one target payment card corresponding to the payment complaint of the user is further acquired by invoking the target payment card identification model to perform:
  in response to determining that the sum of the third number, the second number, and the first number is less than the preset threshold, acquiring new cards used by the user, wherein the new cards include payment cards most recently used by the user; and
  selecting the high-risk cards, the abnormal cards, the non-abnormal cards, and at least one of the new cards as the at least one target payment card.

* * * * *